A. HERCER.
BIRD CAGE SCREEN.
APPLICATION FILED FEB. 24, 1916.
1,186,782.
Patented June 13, 1916.
2 SHEETS—SHEET 1.
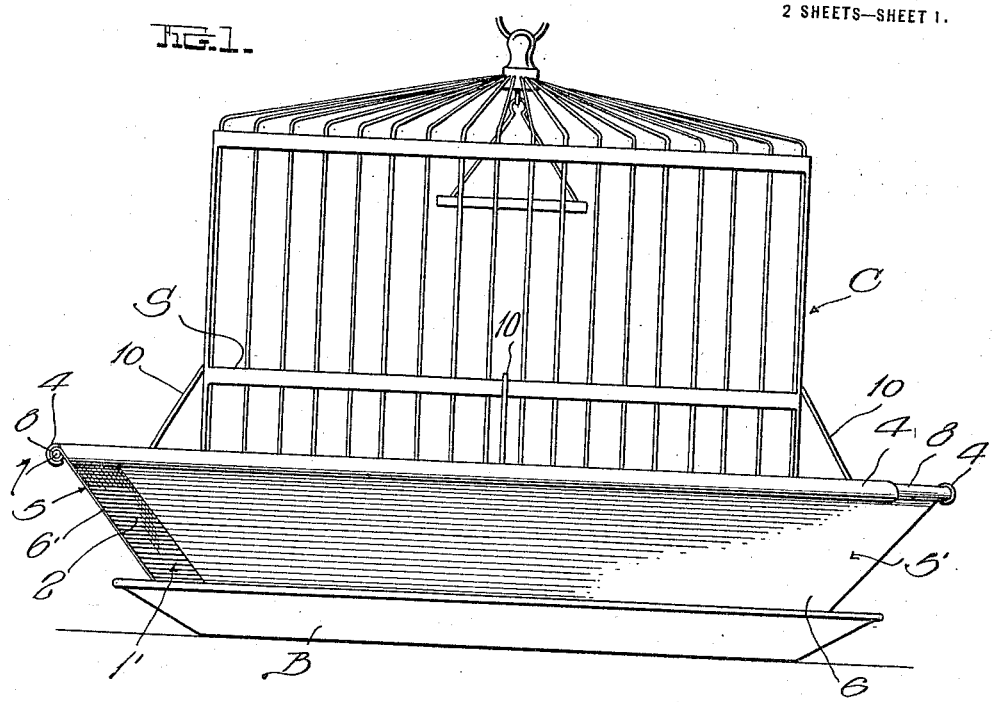
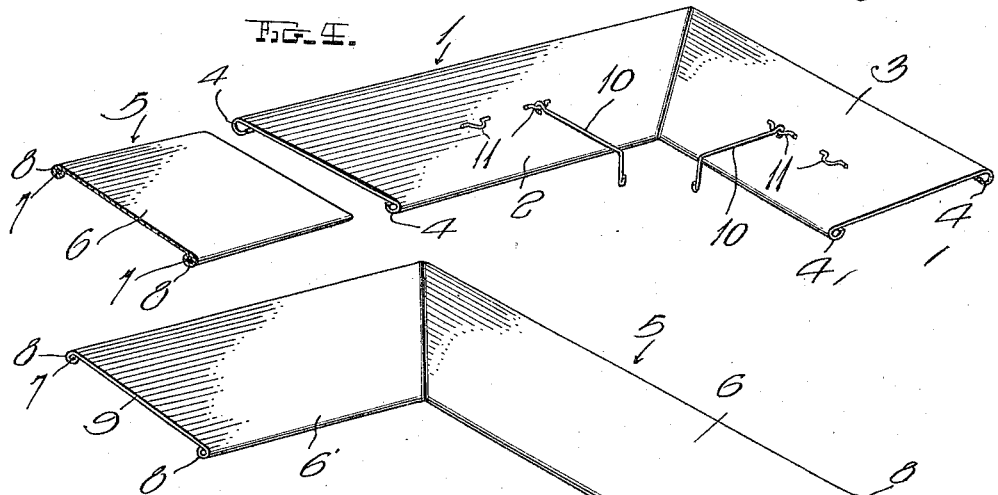
Witnesses
H. Woodard
Inventor
Anton Hercer
by H. B. Willson & Co.
Attorneys

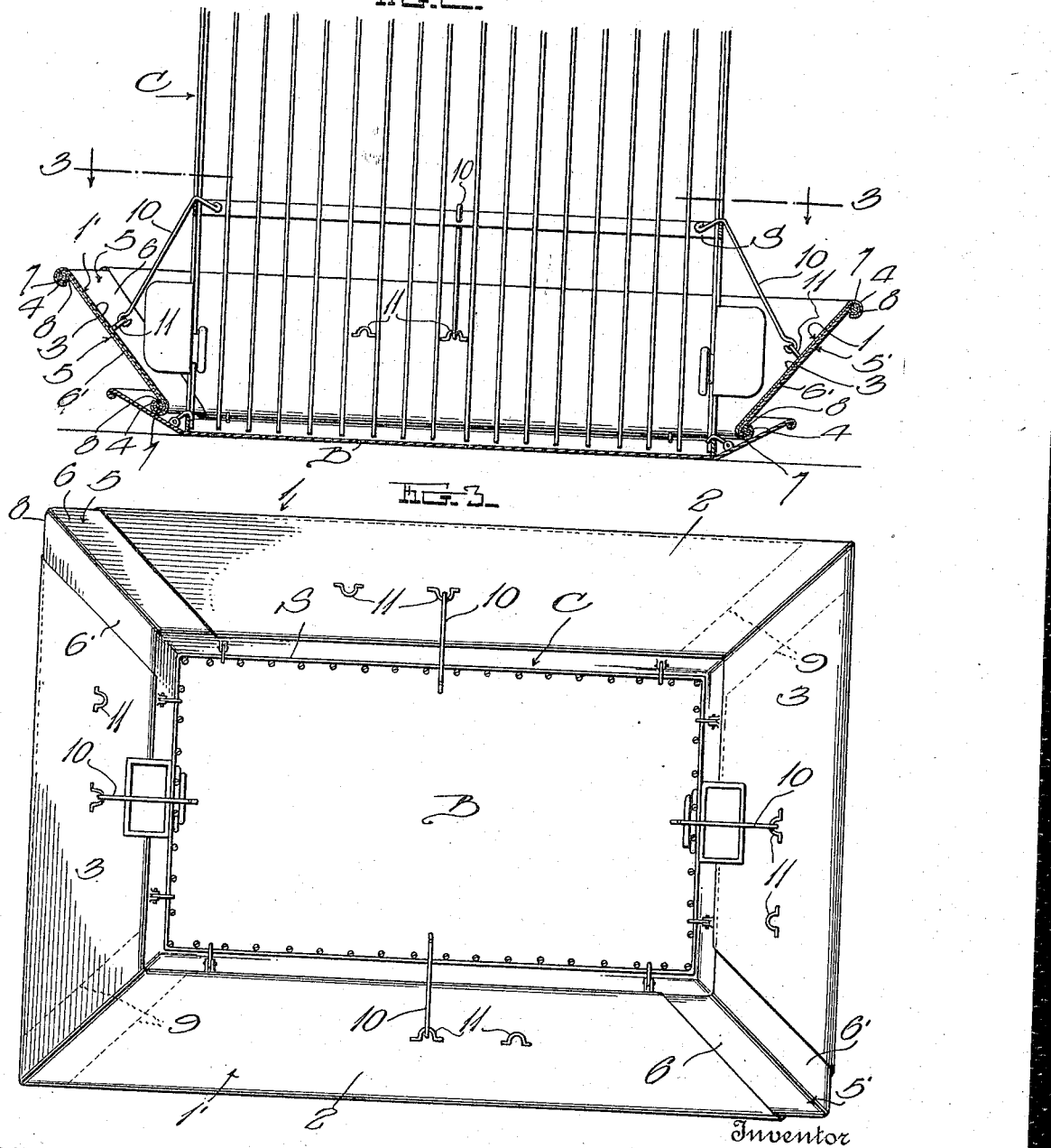

UNITED STATES PATENT OFFICE.

ANTON HERCER, OF SPRING VALLEY, ILLINOIS.

BIRD-CAGE SCREEN.

1,186,782.  Specification of Letters Patent.  Patented June 13, 1916.

Application filed February 24, 1916. Serial No. 80,221.

*To all whom it may concern:*

Be it known that I, ANTON HERCER, a citizen of the United States, residing at Spring Valley, in the county of Bureau and State of Illinois, have invented certain new and useful Improvements in Bird-Cage Screens; and I do declare the following to be a full, clear, and exact description of the invention, such as will enable others skilled in the art to which it appertains to make and use the same.

This invention relates to improvements in cage screens, such as are particularly adapted for bird cages to prevent the scattering of the seed.

The principal object of the invention is to provide a device of this character which can be readily adjusted to fit any size cage.

A further object is to provide a screen which may be used in connection with cages having bottoms which extend beyond the sides, or with those which do not have such extended bottoms.

A still further object is to provide a device, the parts of which can be readily separated from one another to allow the same to be packed in a small space for shipping or storage.

With the above and many other objects in view, my invention resides in the novel features of construction, combination and arrangement of parts which will hereinafter be more particularly described and claimed, and shown in the accompanying drawings wherein:—

Figure 1 is a side elevation of a bird cage equipped with one of my improved screens; Fig. 2 is a central vertical section through the structure shown in Fig. 1; Fig. 3 is a horizontal section on the line 3—3 of Fig. 2; Fig. 4 is a detail perspective view of one of the outer sections showing a portion of one of the inner sections arranged in juxtaposition thereto; and, Fig. 5 is a similar view of one of the inner sections complete.

In the accompanying drawings I have shown my improved screen applied to a bird cage C of ordinary construction having a detachable bottom B, the outer edges of which project beyond the sides of the cage in the usual manner.

The invention comprises a pair of sections 1 and 1', each being constructed in the form of a right angle and disposed in the form of a rectangle. As shown each of the sections 1 and 1' has a long arm 2 and a short arm 3, the free end of each arm 3 being disposed adjacent the end of each arm 2 when the sections are arranged in the form of a rectangle. The arms are preferably inclined upwardly and outwardly and have their longitudinal edges bent laterally outward in the form of a roll so as to provide the tubular guides 4, both on the upper and lower edges of the sections.

An additional pair of right angular sections 5 and 5' are provided for connecting the free ends of the arms of the first mentioned sections. The arms 6 of the sections 5 and 5' have their longitudinal edges bent around a reinforcing wire 7 to provide the beads 8 which are adapted to slide in the tubular guides 4 when the sections are engaged. The arms 6 of the sections 5 and 5' are disposed on the outer sides of the arms 2 and 3 of the other sections and adapted to slide thereon, when the beads are in the guides 4. Since the arms of both the sections 5 and 5', and 6 and 6' are inclined upwardly and outwardly, the free ends thereof are beveled off as shown at 9 to allow the free ends of the arms 2 and 3 to contact with the angle of the sections 5 and 5'.

By this arrangement the screen composed of the four sections can be moved in the proper directions to either enlarge or decrease the size of the same so that it can be applied to cages of various sizes. It is obvious that when the arms 3 are pulled apart the long arms 6 of one pair of sections will slide over the arms 2 and thus provide an elongated screen, but when the arms 2 are pulled apart a screen which is more nearly square will be formed. Thus a very great range of adjustment may be had and practically any size rectangular cage can be equipped with one of these screens without changing the length of the arms of the sections. When the screen is to be applied to a bird cage it is adjusted to the proper size and then slipped over the top of the cage until the lower edges of the arms of the several sections are resting on the extended portion of the bottom B thereof. When in this position the screen will effectively prevent the seeds from being scattered from the cage and over the floor below.

When the screen is to be used on cages which do not have bottoms that project beyond the sides of the cage, or when it is desired to leave the screen in place when the bottom of the cage has been removed for cleaning or for other purposes, I provide the hooks 10, the free ends of which engage the wires of the cage or the brace strip S thereof. These hooks 10 are connected by their ends to the arms 2 and 3 of the sections 1 and 1', one hook being used on each arm and is held in one of the eyes 11 formed thereon. As shown in the drawings two of these eyes 11 are provided for each arm of the sections 1 and 1' and are disposed substantially in the middle of the length thereof. By providing a pair or more of eyes for each side of the screen the hooks may be adjusted to one or the other and maintained substantially in the center so as to more securely hold the same to the cage.

From the foregoing description taken in connection with the accompanying drawings, it will be seen that I have produced a very simply constructed screen which will effectively prevent the scattering of seed and the like from the cage to which it is applied. When the screen is to be stored, or a number of them shipped, the sections 1 and 1' are slid from the sections 5 and 5' and the several parts can then be disposed in a very small space.

I claim as my invention:

1. The combination with a cage; of a screen therefor comprising a pair of sections to be disposed around the cage, tubular guides on the longitudinal edges of the arms of said sections, an additional pair of sections, the longitudinal edges thereof being disposed in said guides and slidable therein to adjust the screen to the cage, a plurality of eyes on each of the arms of the first mentioned sections, and a hook for each arm of the first mentioned sections, each of said hooks being carried by one of the eyes of each arm and adapted to be moved to the others, the free ends of said hooks engaging said cage.

2. A bird cage screen comprising a pair of right angular sections disposed in the form of a rectangle, the walls thereof being inclined upwardly and outwardly, the longitudinal edges of the arms of said sections having tubular guides formed by rolling the edge portions thereof outwardly, an additional pair of right angular sections also having inclined walls, beads on the longitudinal edges of the arms of said last mentioned sections and slidable in said guides, the arms of each of the last named sections being slidable over the adjacent arms of the other two sections, whereby said screen may be increased or decreased in size, a plurality of eyes on each arm of the first mentioned sections, and a hook for each of the arms of the first mentioned section, each of said hooks being carried by one of the eyes of each arm and adapted to be moved to the other.

In testimony whereof I have hereunto set my hand in presence of two subscribing witnesses.

ANTON HERCER.

Witnesses:
J. C. SITTERLY,
A. H. IMHOF.

Copies of this patent may be obtained for five cents each, by addressing the "Commissioner of Patents, Washington, D. C."